United States Patent [19]

Yoshimura et al.

[11] Patent Number: 5,155,583
[45] Date of Patent: Oct. 13, 1992

[54] VIDEO SIGNAL PROCESSING SYSTEM WITH SELECTIVE SIGNAL EXTRACTION AND DELAY

[75] Inventors: Katsuji Yoshimura; Tadayoshi Nakayama; Hisashi Ishikawa; Chikara Sato, all of Kanagawa, Japan

[73] Assignee: Canon Kabushiki Kaisha, Tokyo, Japan

[21] Appl. No.: 668,748

[22] Filed: Mar. 13, 1991

Related U.S. Application Data

[60] Continuation of Ser. No. 348,865, May 8, 1989, abandoned, which is a division of Ser. No. 252,024, Sep. 28, 1988, Pat. No. 4,882,615, which is a continuation of Ser. No. 11,515, Feb. 5, 1987, abandoned.

[30] Foreign Application Priority Data

| Feb. 10, 1986 | [JP] | Japan | 61-25749 |
| Feb. 10, 1986 | [JP] | Japan | 61-25750 |
| Feb. 10, 1986 | [JP] | Japan | 61-25751 |
| Feb. 10, 1986 | [JP] | Japan | 61-25752 |
| Feb. 10, 1986 | [JP] | Japan | 61-25753 |
| Feb. 14, 1986 | [JP] | Japan | 61-28949 |

[51] Int. Cl.⁵ .................................................. H04N 9/78
[52] U.S. Cl. ................................................... 358/34
[58] Field of Search ........................................ 358/31

[56] References Cited

U.S. PATENT DOCUMENTS

| 4,524,382 | 6/1985 | Tanaka et al. | 358/31 |
| 4,626,895 | 12/1986 | Reitmeier | 358/31 |

FOREIGN PATENT DOCUMENTS

| 129891 | 8/1983 | Japan | 358/31 |
| 62292 | 4/1985 | Japan | 358/31 |
| 139090 | 7/1985 | Japan | 358/31 |

*Primary Examiner*—John W. Shepperd
*Attorney, Agent, or Firm*—Robin, Blecker, Daley & Driscoll

[57] ABSTRACT

A video signal processing system for use in an apparatus that handles a composite color television signal having therein frequency-multiplexed luminance and chrominance signals frequency-multiplexed in the composite color television signal are separated, comprises: remark picture element signal extracting circuitry for taking part of the composite color television signal as a remark picture element signal and extracting the remark picture element signal from the composite color television signal; reference picture element signal extracting circuitry for taking the composite color television signal whose chrominance signal frequency-mutliplexed therein is of the reverse phase to the chrominance signal frequency-multiplexed in the remark picture element signal as a reference picture element signal and extracting a plurality of the reference picture signals from the composite color television signal; selecting circuitry for selecting out of the plurality of reference picture element signals extracted by the reference picture element signal extracting circuitry the one which takes a median value and producing it; and separating circuitry for separating the luminance signal and chrominance signal frequency-multiplexed in the selected reference picture element signal by using the remark picture element signal extracted by the remark picture element signal extracting circuitry.

20 Claims, 19 Drawing Sheets

F I G. 14

| PICTURE ELEMENT BLOCK SELECTED | A5 | B5 | C5 | B5 | E5 | F5 | G5 | G5 | F5 | E5 | A5 | B5 | C5 | D5 | G5 |
|---|---|---|---|---|---|---|---|---|---|---|---|---|---|---|---|
| S6 | ○ | × | × | × | ○ | ○ | ○ | × | × | × | ○ | ○ | ○ | × | ○ |
| S7 | × | ○ | × | × | ○ | × | ○ | ○ | ○ | × | ○ | ○ | × | ○ | ○ |
| S8 | × | × | ○ | × | × | ○ | × | ○ | × | × | ○ | × | ○ | ○ | ○ |
| S9 | × | × | × | ○ | × | × | × | × | ○ | ○ | × | ○ | ○ | ○ | ○ |

STRENGTH OF CORRELATION TO S3

○: STRONG CORRELATION

VIDEO SIGNAL PROCESSING SYSTEM WITH SELECTIVE SIGNAL EXTRACTION AND DELAY

CROSS REFERENCE TO RELATED APPLICATION/PATENTS

This is a continuation of application Ser. No. 348,865 filed May 8, 1989, now abandoned, which was a division of application Ser. No. 252,024 filed Sep. 28, 1988, now U.S. Pat. No. 4,882,615, which was a continuation of application Ser. No. 011,515 filed Feb. 5, 1987, now abandoned.

BACKGROUND OF THE INVENTION

1. Field of the Invention

This invention relates to video signal processing systems in which a video signal such as the composite color television signal of, for example, NTSC standards, is separated into luminance and chrominance informations.

2. Description of the Related Art

The complete color video signals now in use, a typical example of which is the composite color television signal S of NTSC standards, have the composite form of luminance information Y and chrominance information C, the latter further in the 90°-apart 2-phase modulated form of the two color difference signals U and V (or I and Q) on a color subcarrier of frequency fsc. It can be written as $S=Y+C=Y+U\sin(2+)fsc\ t)+V\cos(2+)fsc\ t)$. From the frame frequency $f_F(30\ Hz)$, field frequency $f_V(60\ Hz)$ and horizontal scanning frequency $f_H$, we have $$f_{sc}=(455/2)f_H=(455/2)(525/2)f_V=(455/2)525f_F$$

For this reason, when the composite color television signal of the NTSC standards is sampled at a frequency equal to 4 times the frequency fsc of the color subcarrier, the sampled portions of the signal convey a series of four different classes of the informations in a distribution shown in FIG. 1. In more detail, the chrominance signal reverses in phase from line to line, and is extracted four samples in each period of the color subcarrier.

In order to retrieve from such a television signal, its luminance and chrominance components Y and C, the prior art makes use of such a forming filter as shown in FIG. 2 as the separator, wherein the arriving portion (Y−C) for the present line of the television signal is added to that portion for the preceding line which was delayed 1H in passing through a circuit 1, or the one (Y+C) by a first adder 2, because, as has been shown in FIG. 1, the chrominance signal in the same vertical position changes its phase 180° between the present and preceding lines. So, the output of the adder 2 represents 2Y. Its level is then attenuated ½ by a first attenuator 3. Thus, the luminance signal Y is separated out. To separate out the chrominance signal C, the arriving television signal (Y−C) is routed to an inverter 4 and its output is added to the output of the 1H delay circuit 1 by a second adder 5. The output of the adder 5 which represents 2C is then attenuated ½ by a second attenuator 6.

It will be appreciated from the foregoing that the principle of such a conventional separator for the luminance and chrominance signals is based on the assumption that the picture element information in the form of a series of sampled portions of the composite color television signal has so strong a correlation in the vertical direction as to permit use of the picture element information of the preceding line for separating out the luminance and chrominance signals of the present line.

With such a conventional type, however, if a scene varies in brightness and color rapidly between the adjacent two of its sampled portions, these portions of the original scene will be reproduced with turbid color or dot hindrance or other deteriorations of the picture quality. Of these, the most serious is that the resolution drops extremely in the vertical direction particularly at the edges of things in the scene.

Attempts have been made to eliminate the above-described problem by using a digital delay circuit that enables the correlation of picture elements in both vertical and horizontal directions to be taken into account. But, any of a wide variety of the previous proposals has an alternate problem that the production cost becomes far higher than when the delay circuit is of the analog type.

SUMMARY OF THE INVENTION

The present invention has for its general object to provide a video signal processing system which can overcome the above-described problems.

Another object of the present invention is to provide a video signal processing system capable of separating a composite color television signal into luminance and chrominance signals without causing deterioration of the resolution in the edge portions of the picture.

Under such an object, according to the present invention, in one embodiment thereof applied to the apparatus which handles a composite color television signal having frequency-multiplexed luminance and chrominance signals, the video signal processing system for separating out the luminance and chrominance signals frequency-multiplexed in the composite color television signal is provided with:

remark picture element signal extracting means for taking a portion of the aforesaid composite color television signal as a remark picture element signal and extracting the remark picture element signal from the composite color television signal, reference picture element signal extracting means for taking the one of the composite color television signals of which the frequency-multiplexed chrominance signal is of the reverse phase to that of the chrominance signal frequency-multiplexed in the remark picture element signal and extracting a plurality of the reference picture element signals from the composite color television signal, selecting means for selecting the one of the plurality of the reference picture element signals extracted by the reference picture element signal extracting means which takes a central value, and separating means using the remark picture element signal extracted by the remark picture element signal extracting means and the reference picture element signals selected by the selecting means for separating out the luminance and chrominance signals frequency-multiplexed in the remark picture element signal and producing them.

Other objects than those described above of the invention and its features will become apparent from the following detailed description of embodiments thereof by reference to the accompanying drawings.

As above noted, this patent derives from a division of application Ser. No. 252,024, filed on Sep. 28, 1988 now U.S. Pat. No. 4,882,615, issued on Jan. 2, 1989.

FIG. 3–17 illustrate first through fifth embodiments of the subject invention and description thereof is set forth in the '615 patent.

Figure 1:
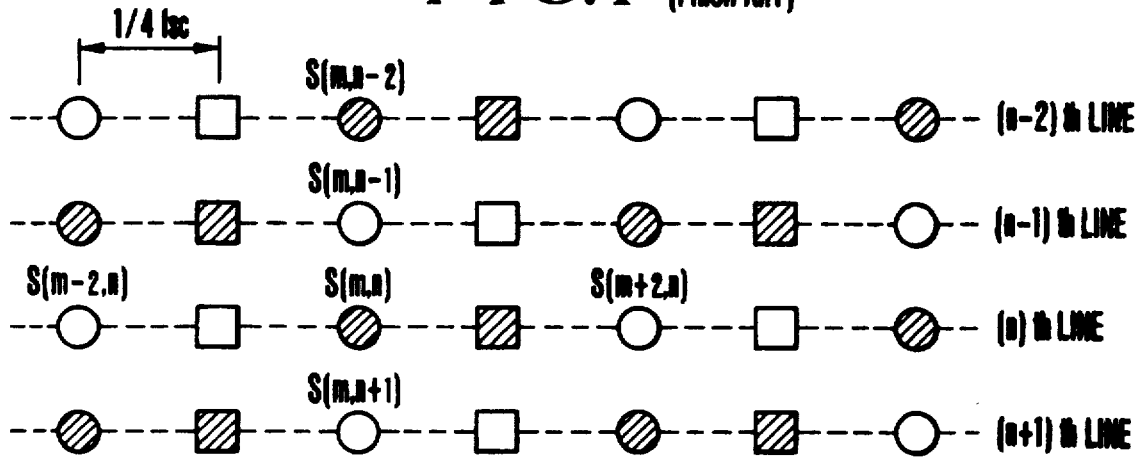
FIG. 1 is a diagram illustrating a series of sampled signals obtained by sampling a composite color television signal of the NTSC standards at a sampling frequency equal to 4 times the frequency of the color subcarrier.
Figure 2:
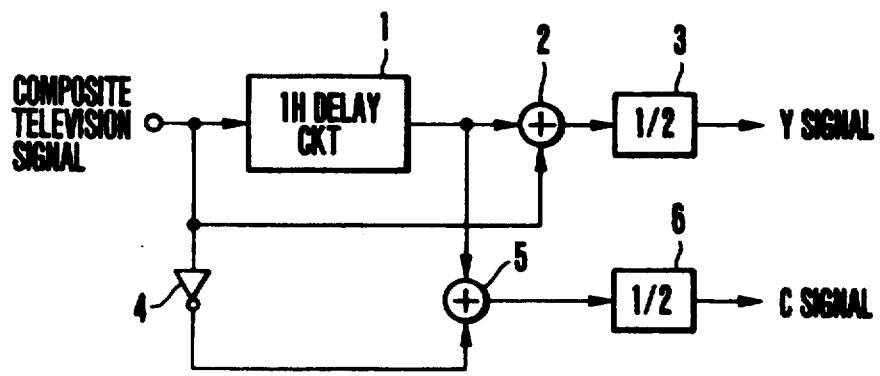
FIG. 2 is a diagram illustrating the outline of the construction of the conventional example of the forming filter for separating out the luminance and chrominance signals.
Figure 3:
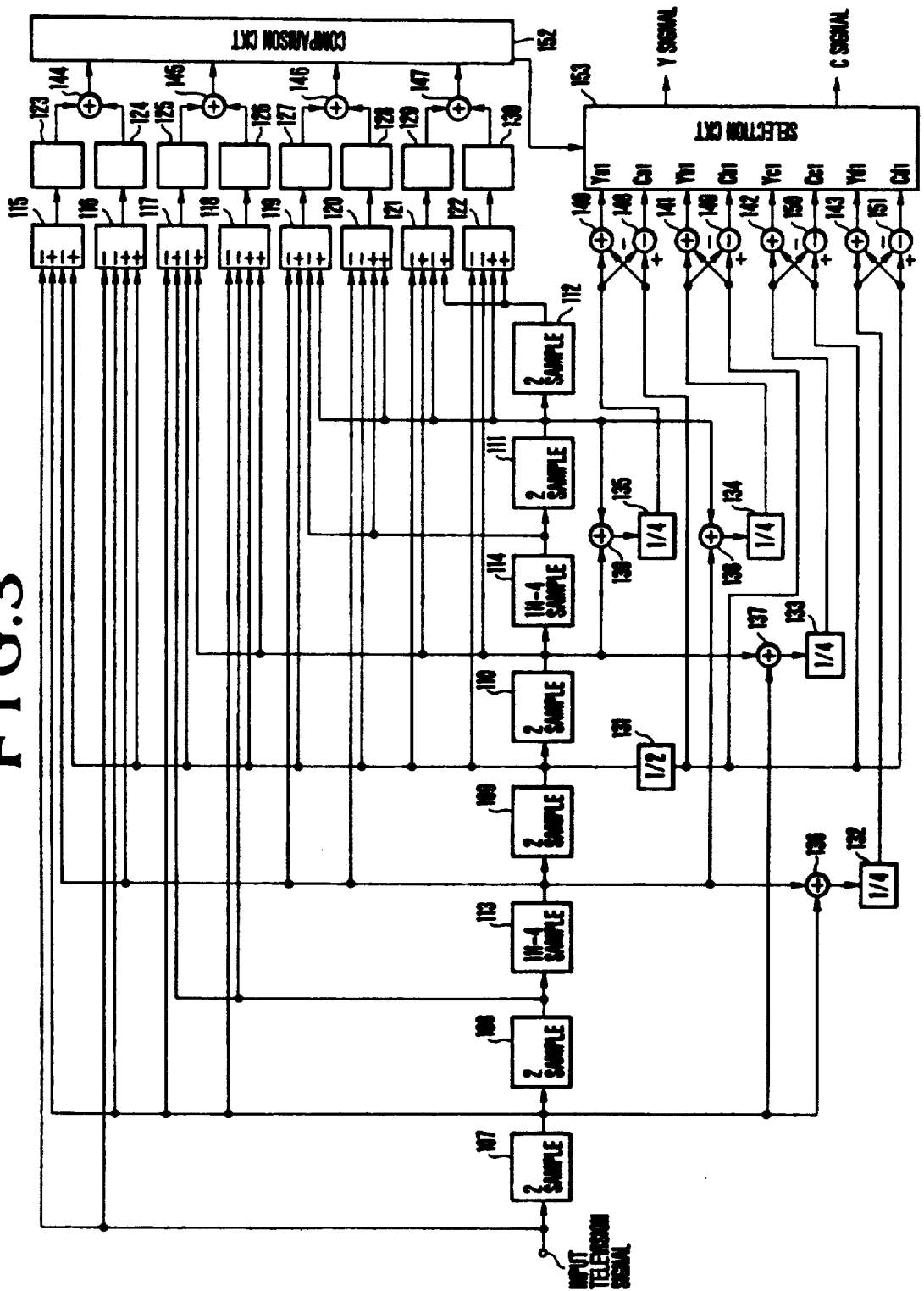
Figure 4:
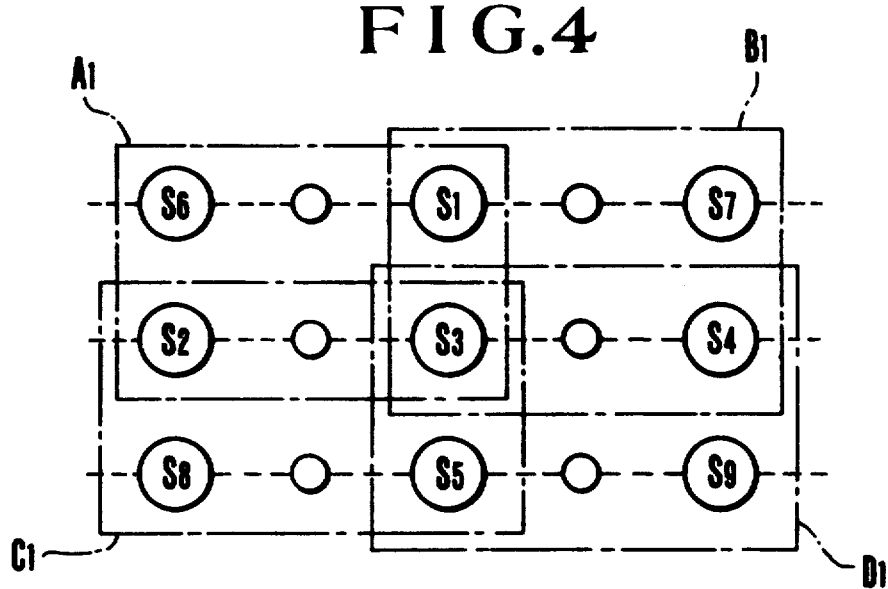
Figure 6:
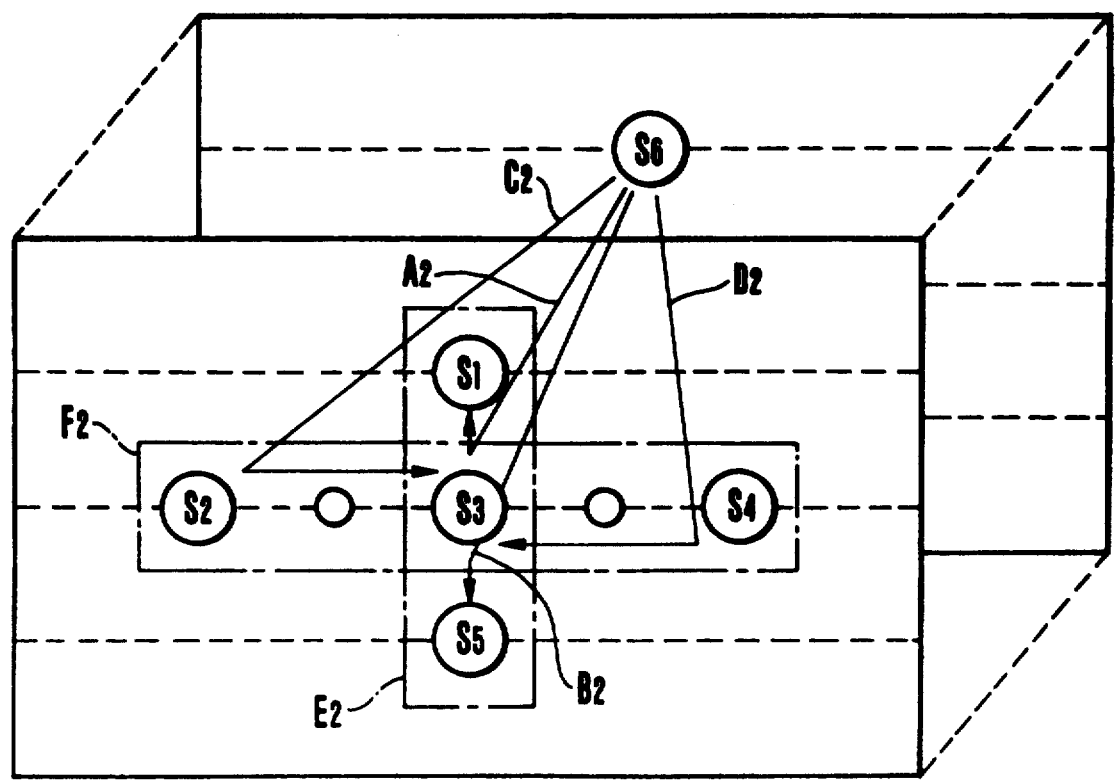
Figure 5:
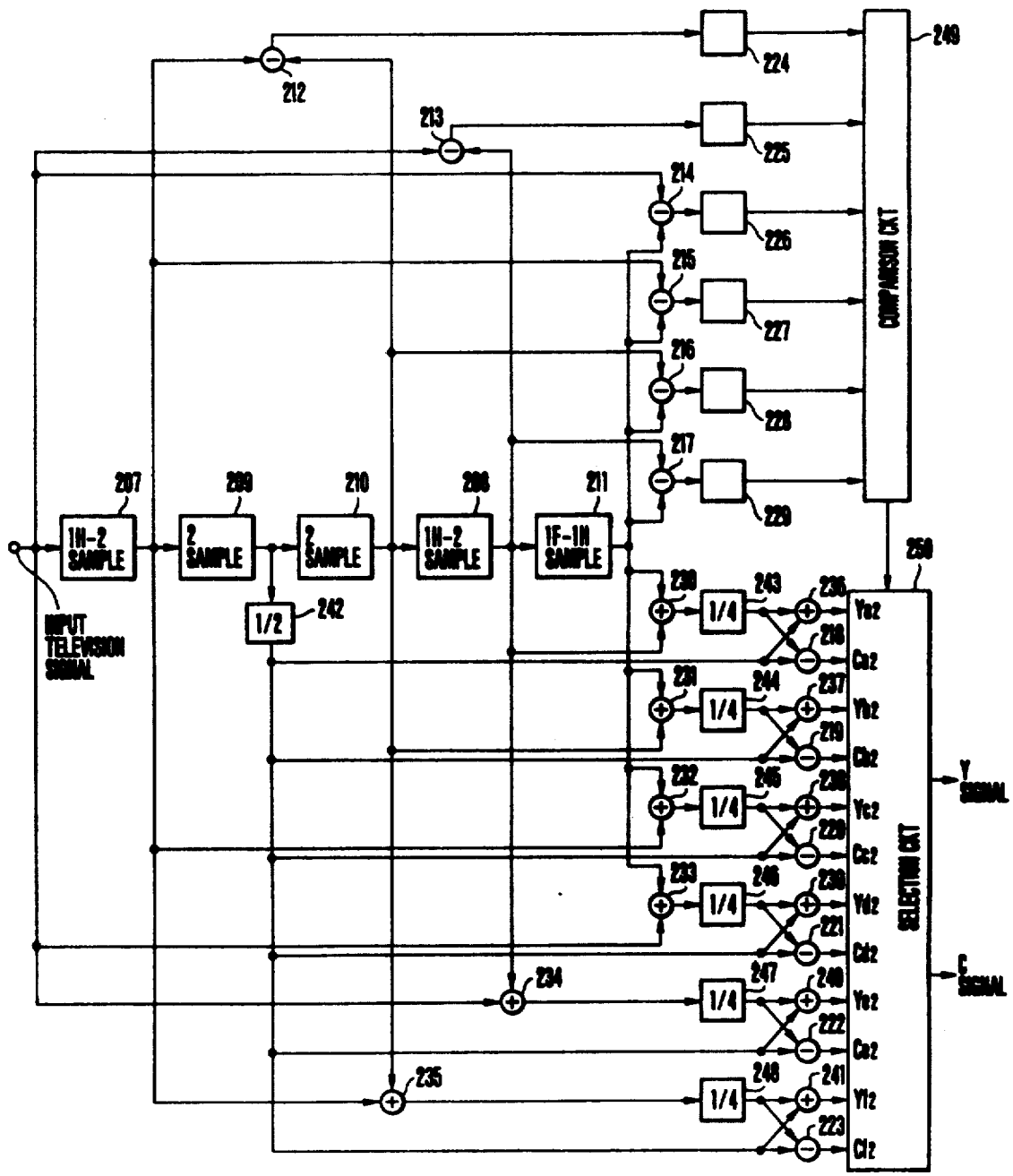
Figure 7:
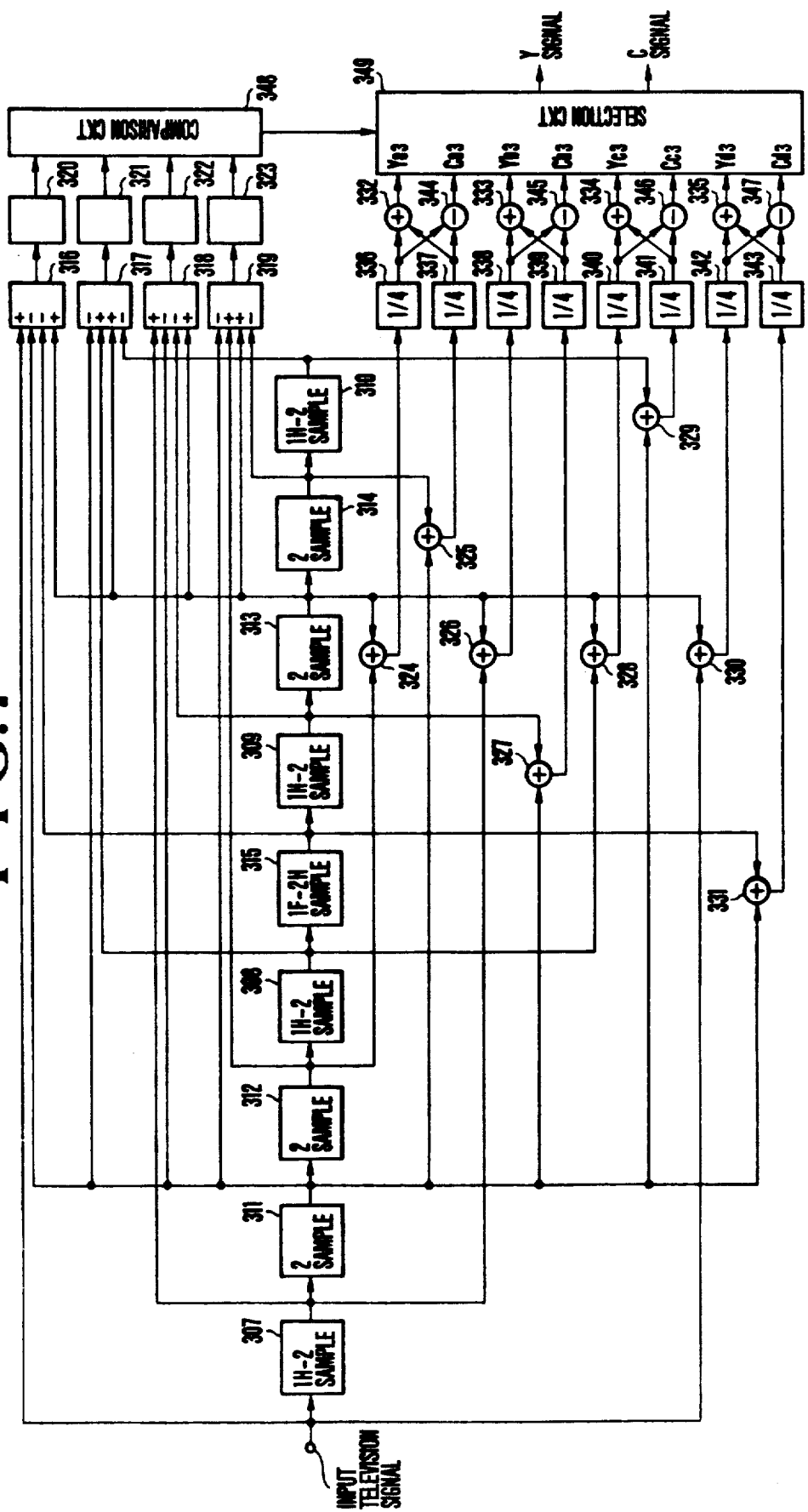
Figure 8:
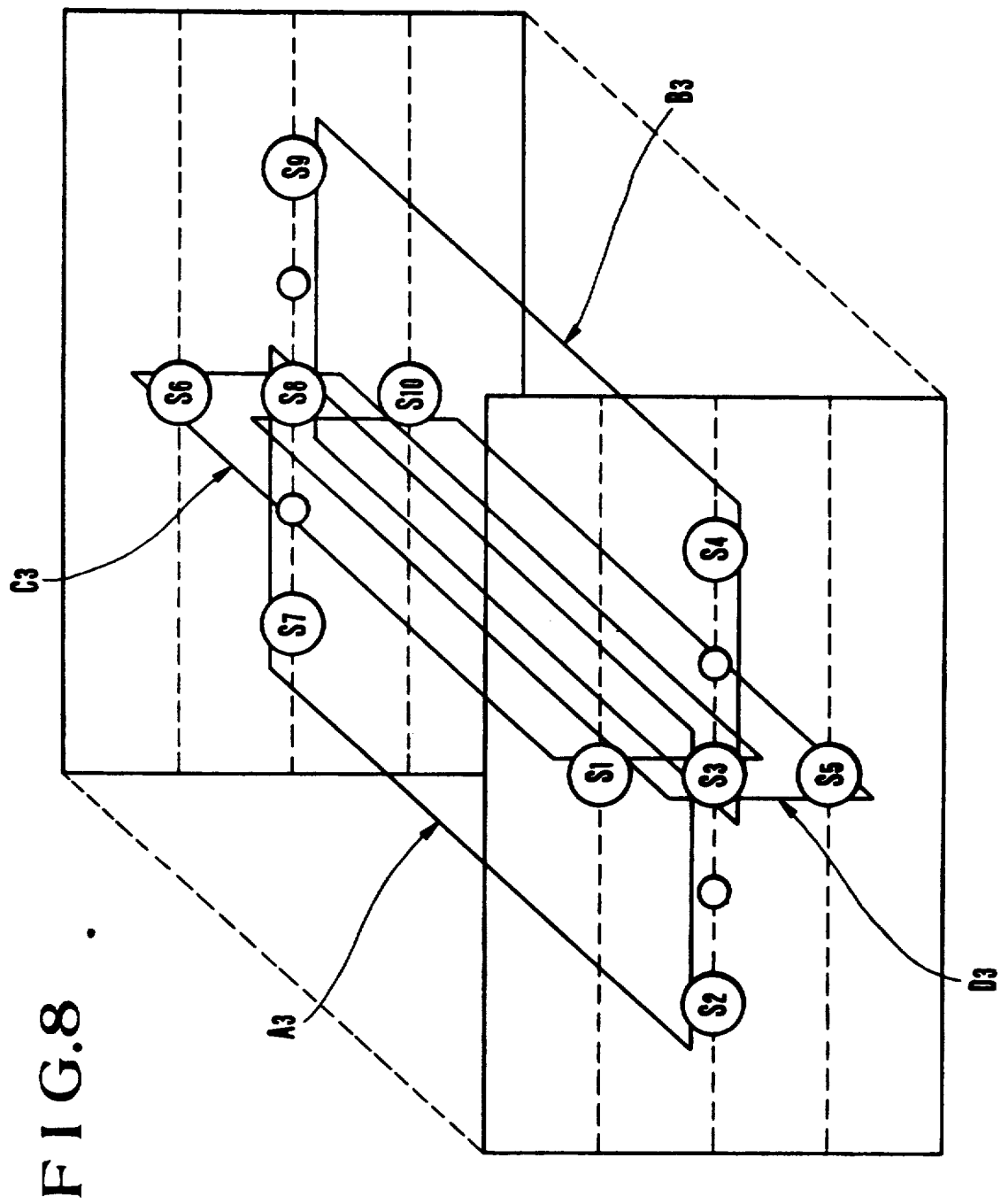
Figure 9:
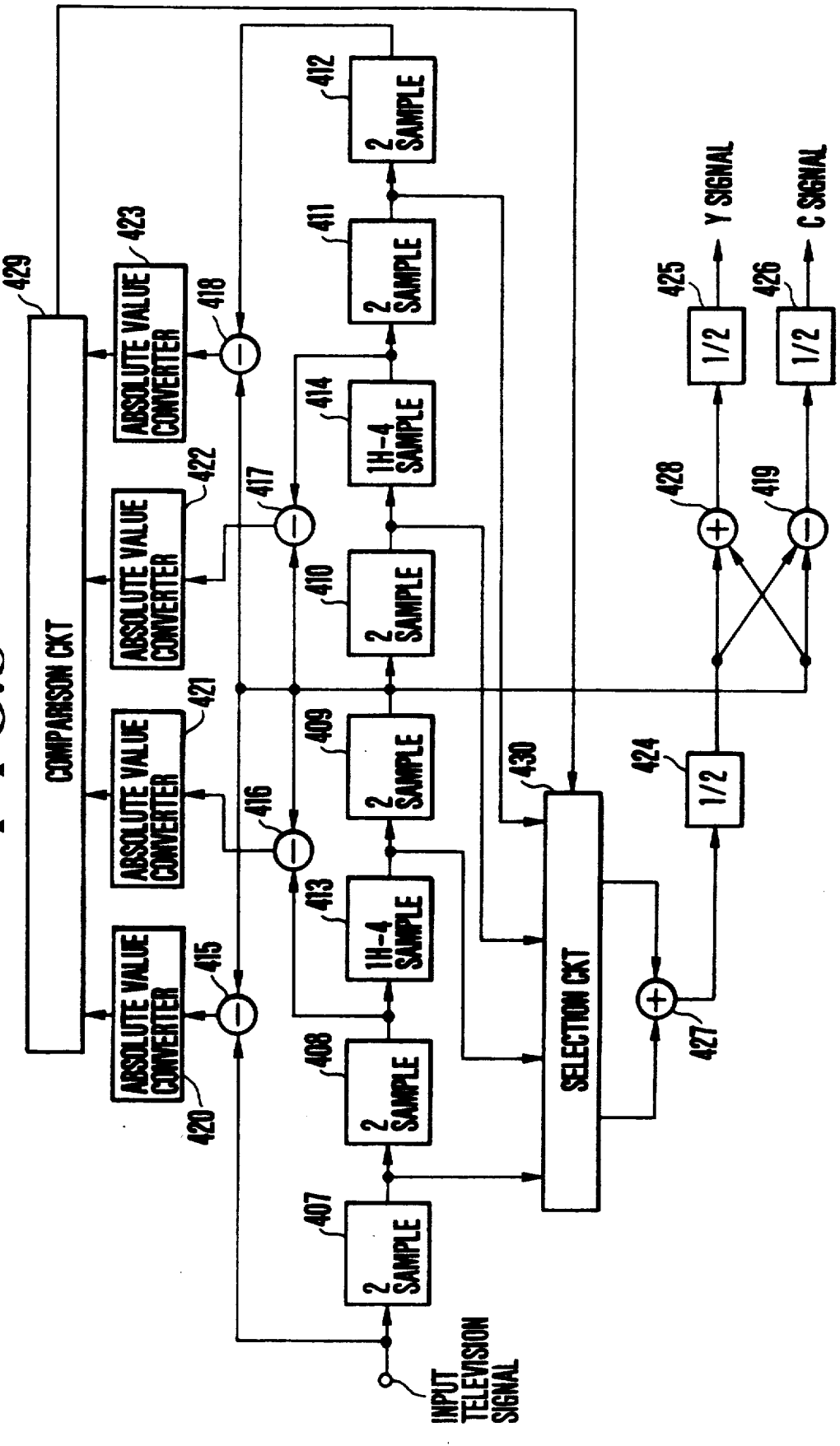
Figure 10:
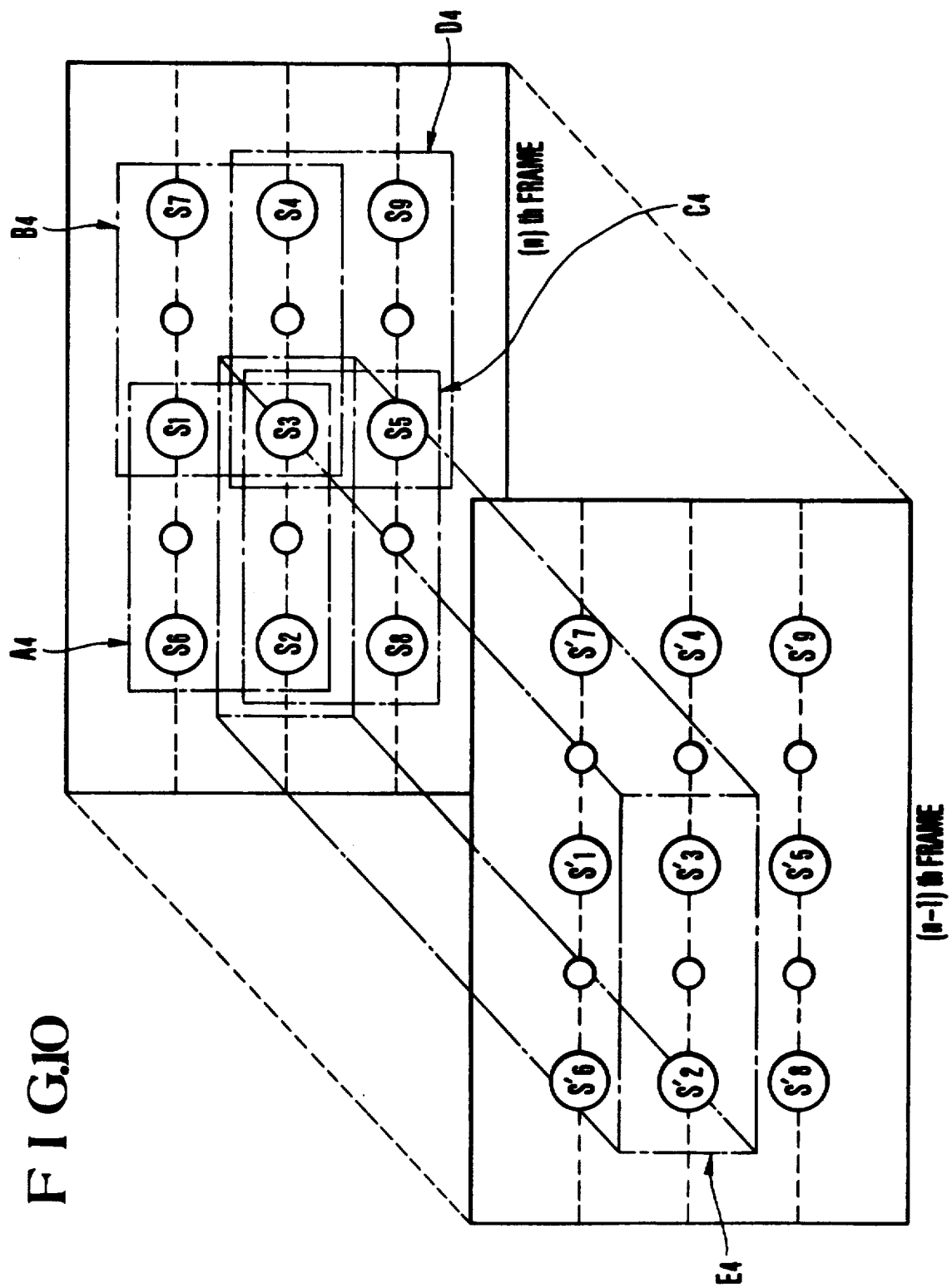
Figure 11:
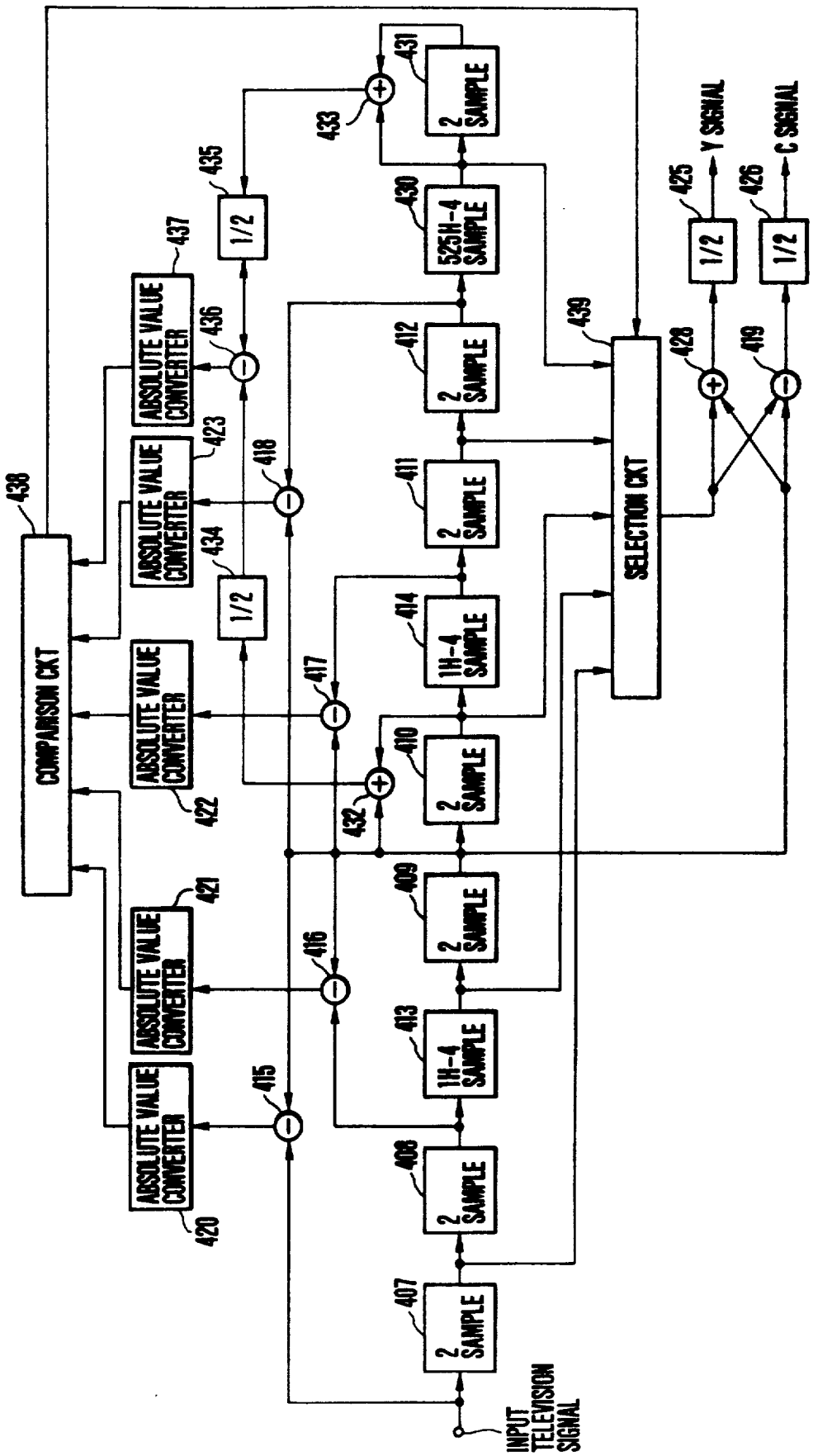
Figure 12:
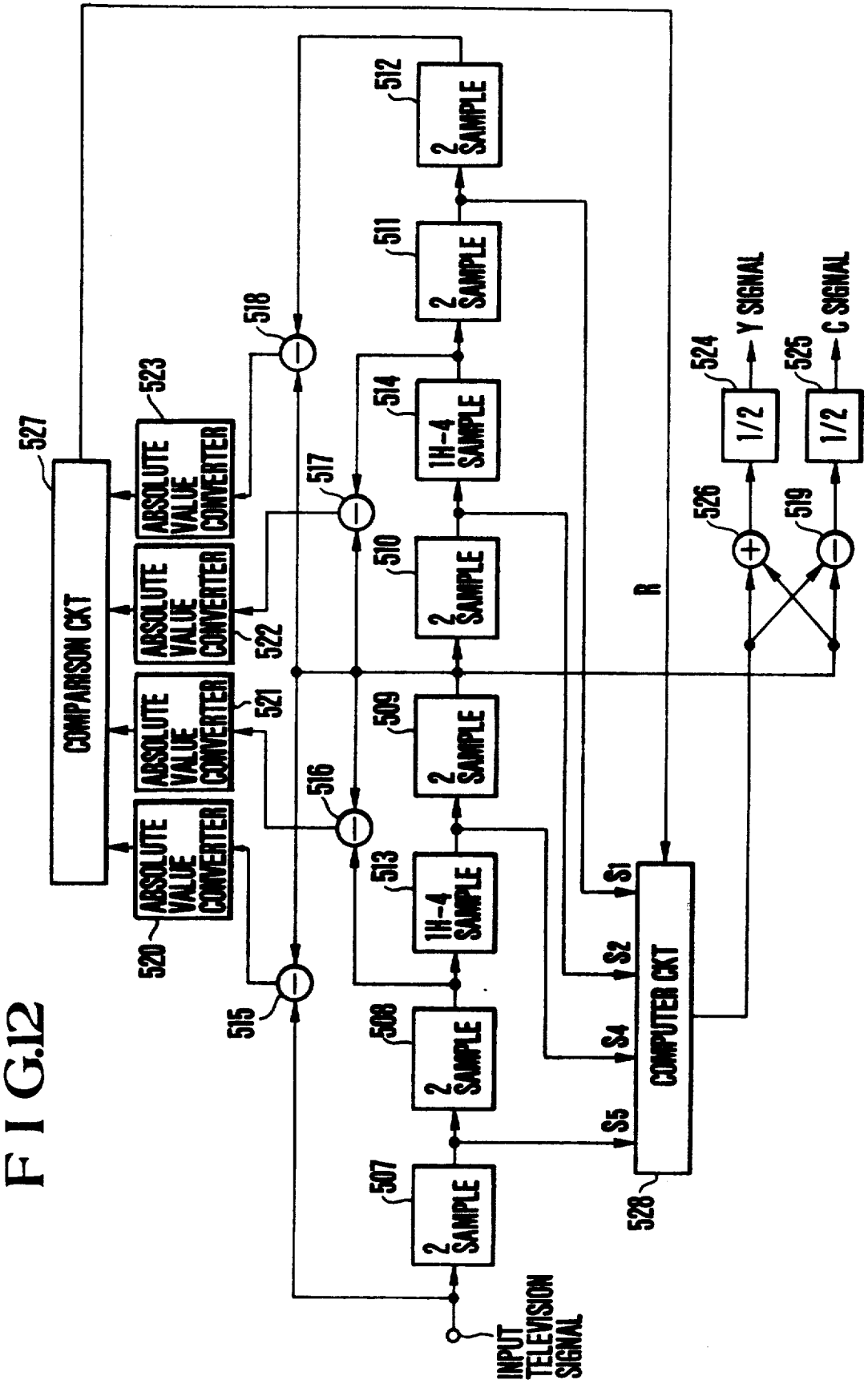
Figure 13:
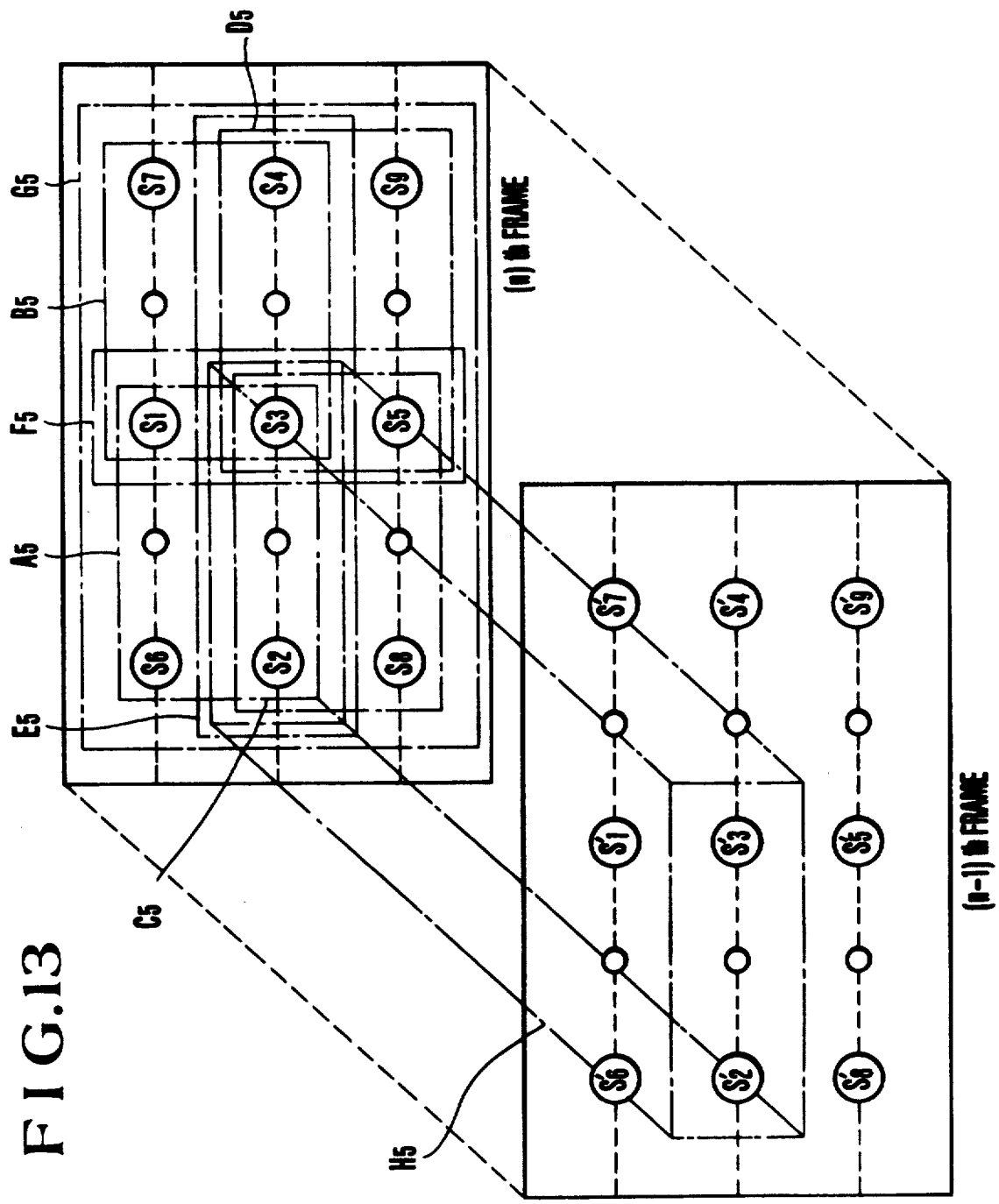
Figure 15:
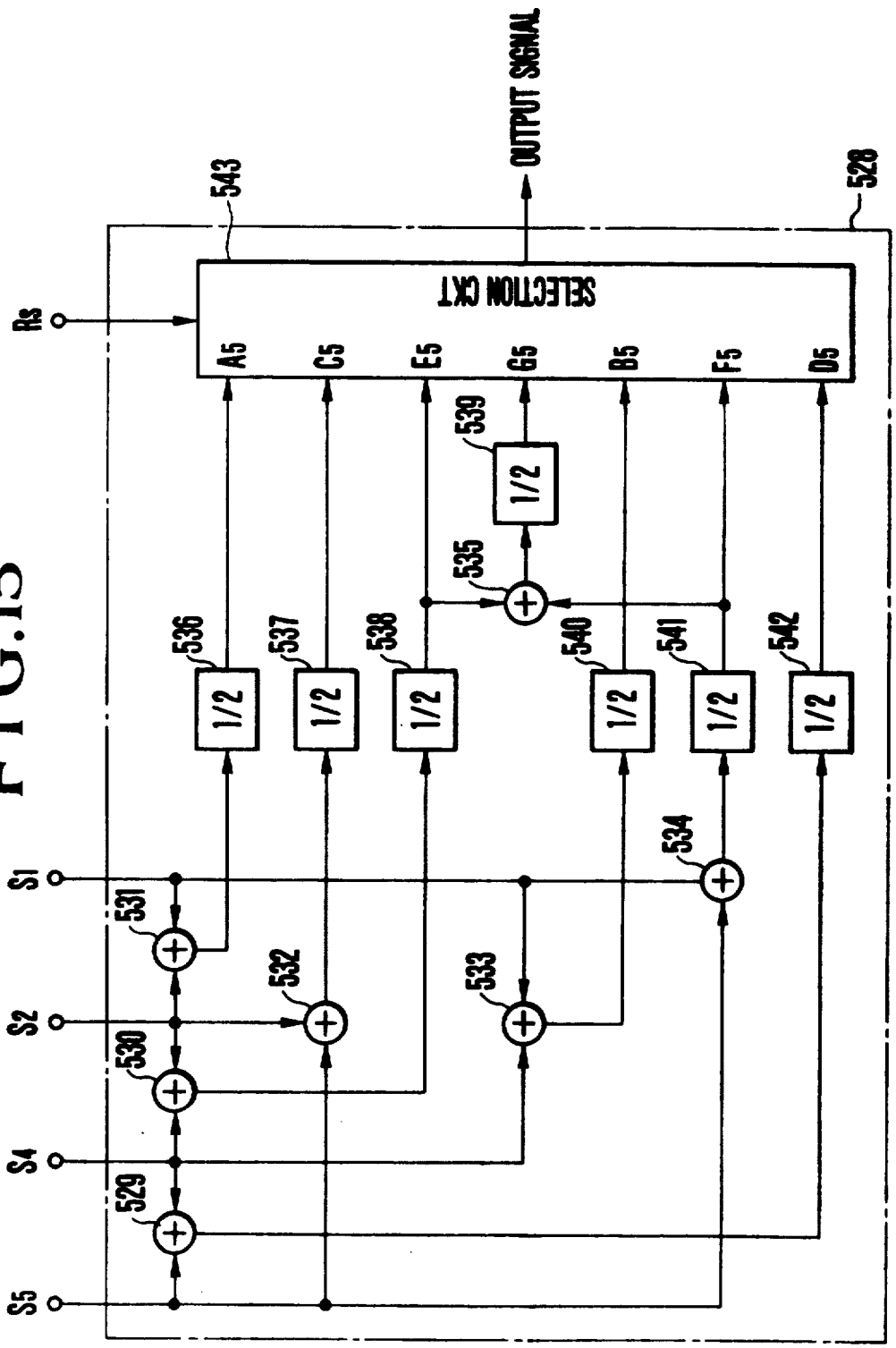
Figure 16:
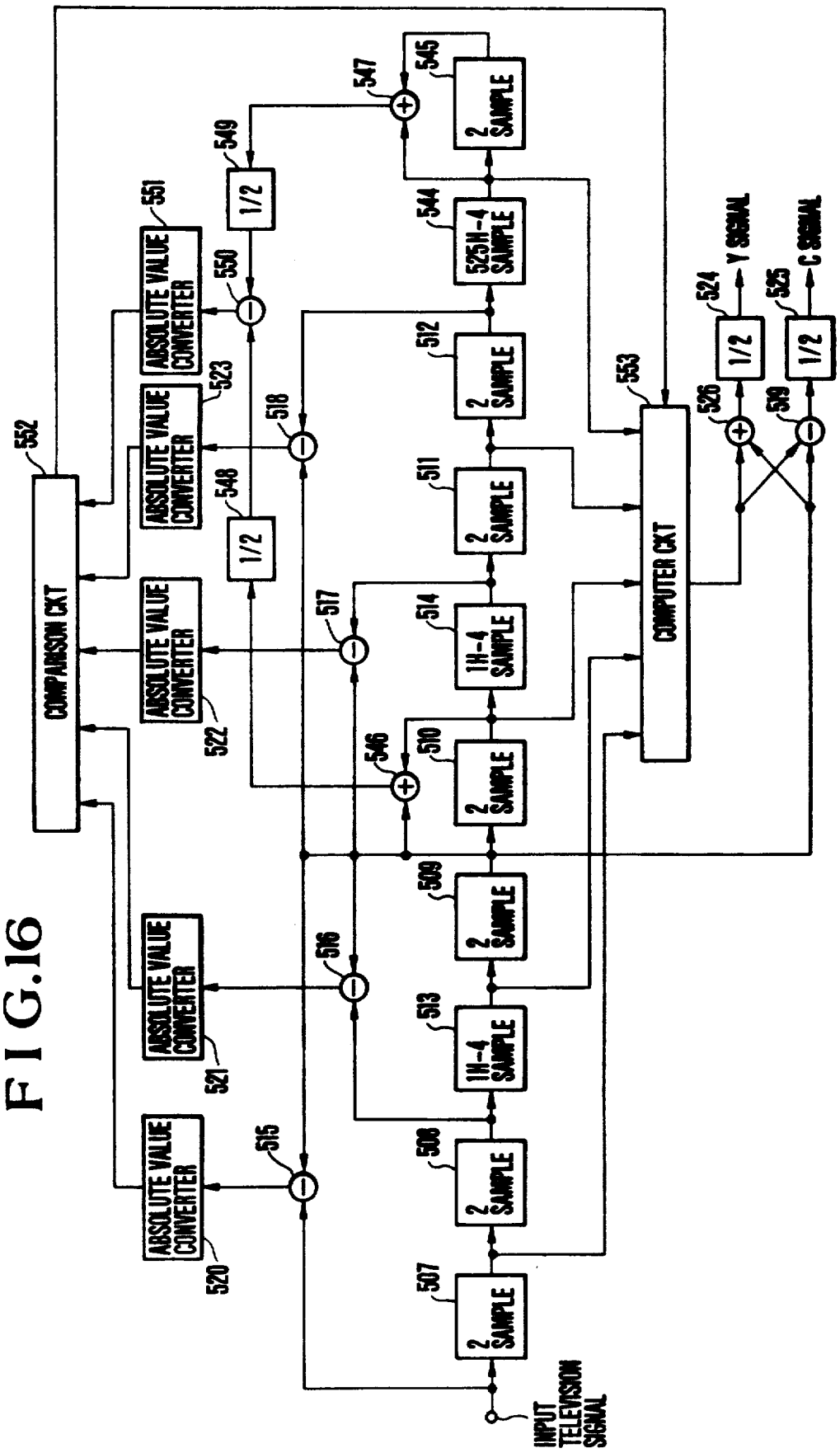
Figure 17:
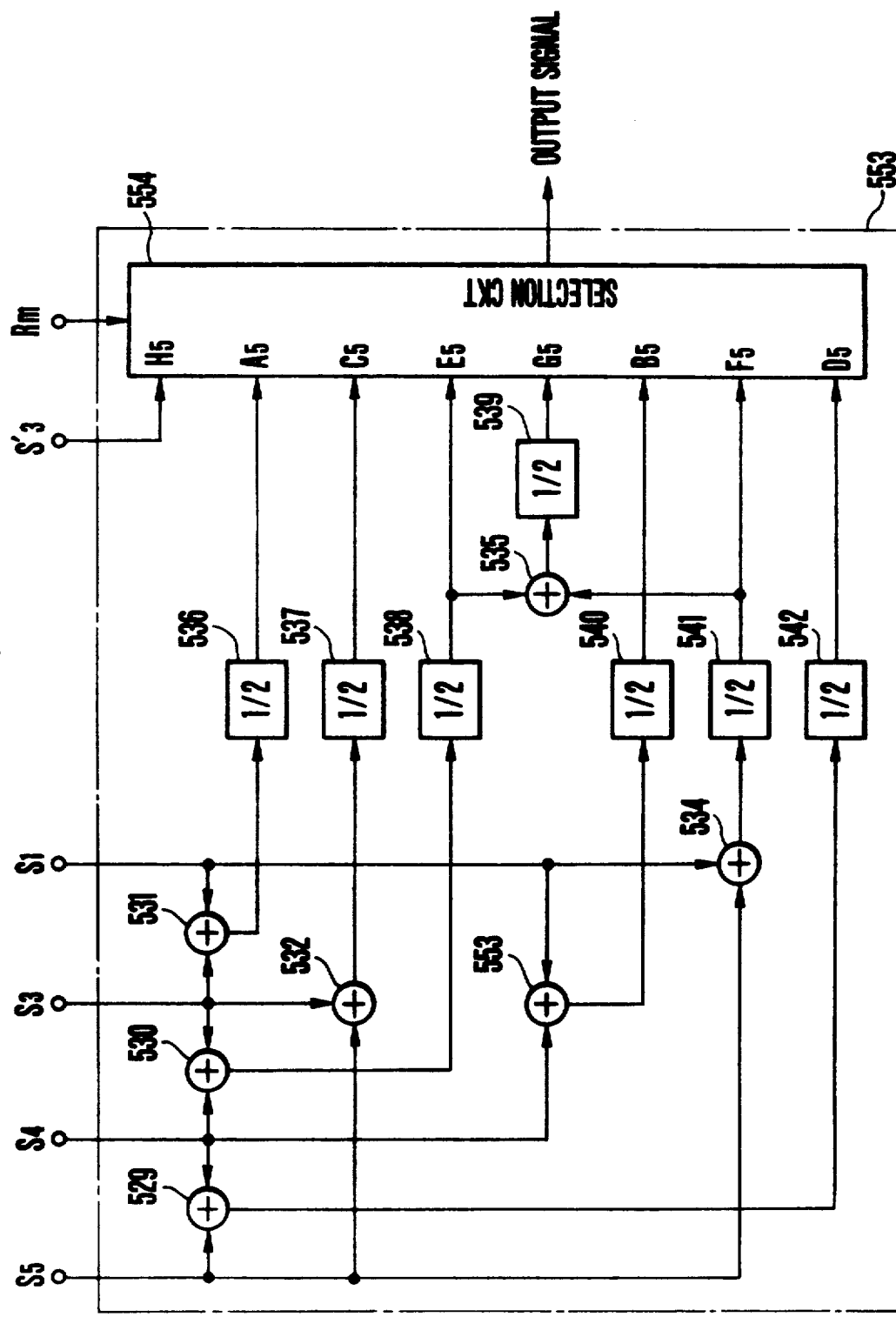
Figure 18:
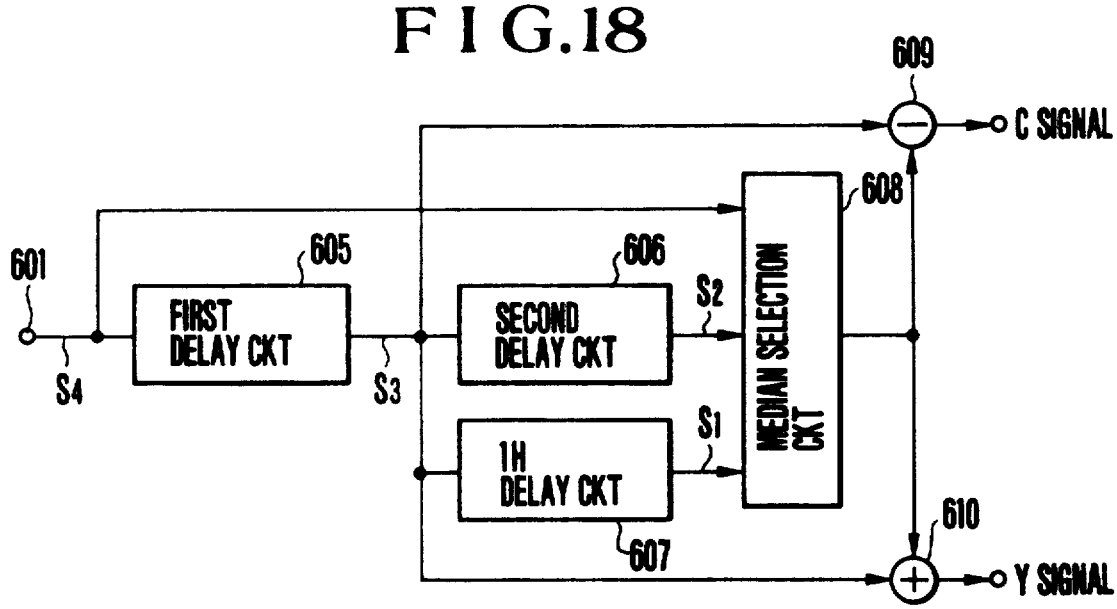

FIG. 18 is a block diagram illustrating a sixth embodiment of the invention.

Figure 19:
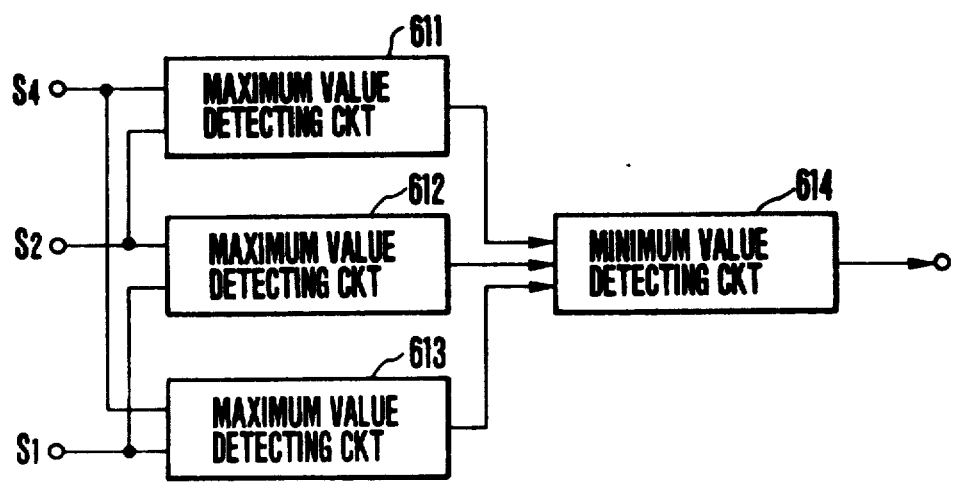

FIG. 19 is a block diagram illustrating the construction of the central value selecting circuit shown in FIG. 18.

Figure 20:
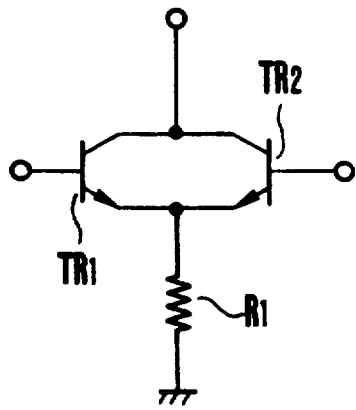

FIG. 20 is a practical circuit diagram of the maximum value detecting circuit shown in FIG. 19.

Figure 21:
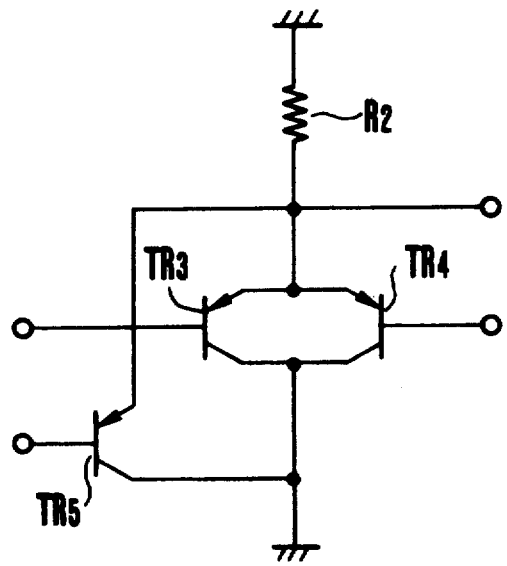

FIG. 21 is a practical circuit diagram of the minimum value detecting circuit shown in FIG. 19.

Figure 22:
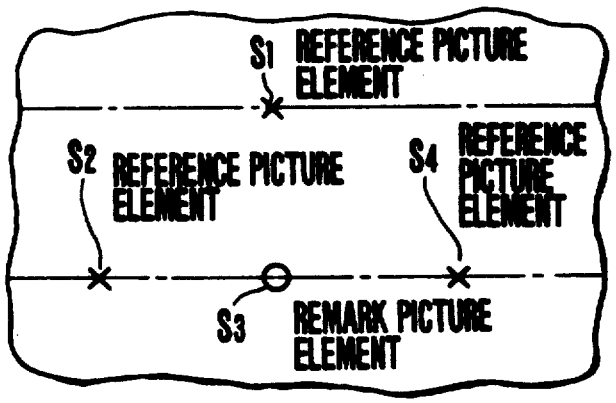

FIG. 22 is a diagram in enlarged scale illustrating the relationship of the positions of the signals S1–S4 in the frame.

Figure 23A:
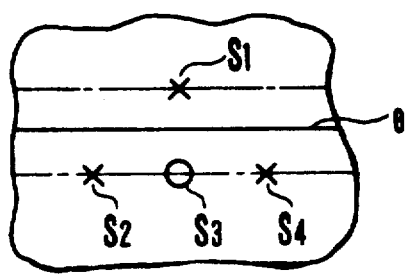
Figure 23B:
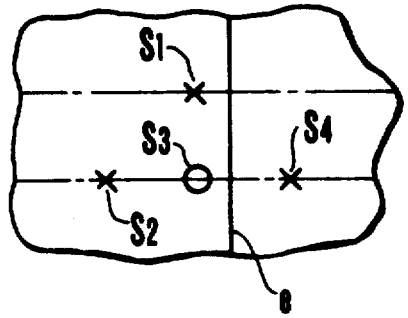

FIGS. 23(a) and 23(b) are diagrams illustrating the presence of an edge, e, of the picture in the frame shown in FIG. 22.

Figure 24A:
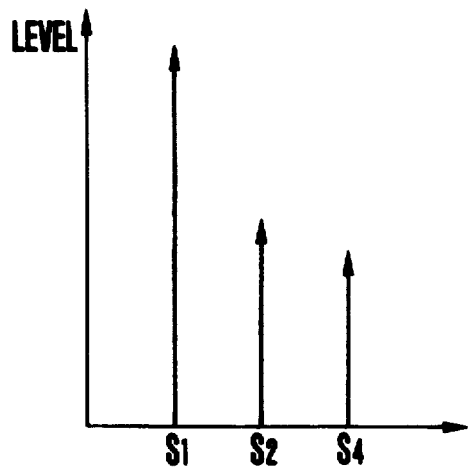
Figure 24B:
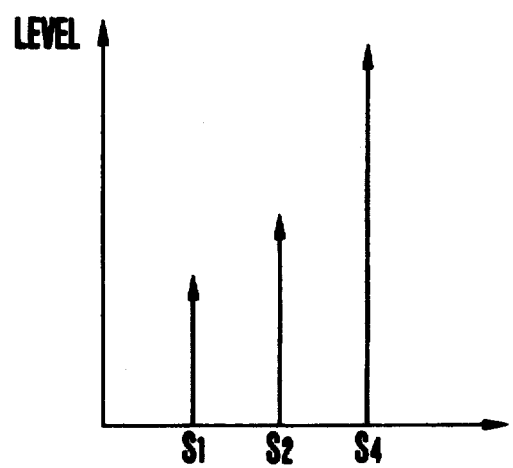

FIGS. 24(a) and 24(b) are graphs illustrating the signal values of the picture elements shown in FIGS. 23(a) and 23(b), respectively.

Figure 25:
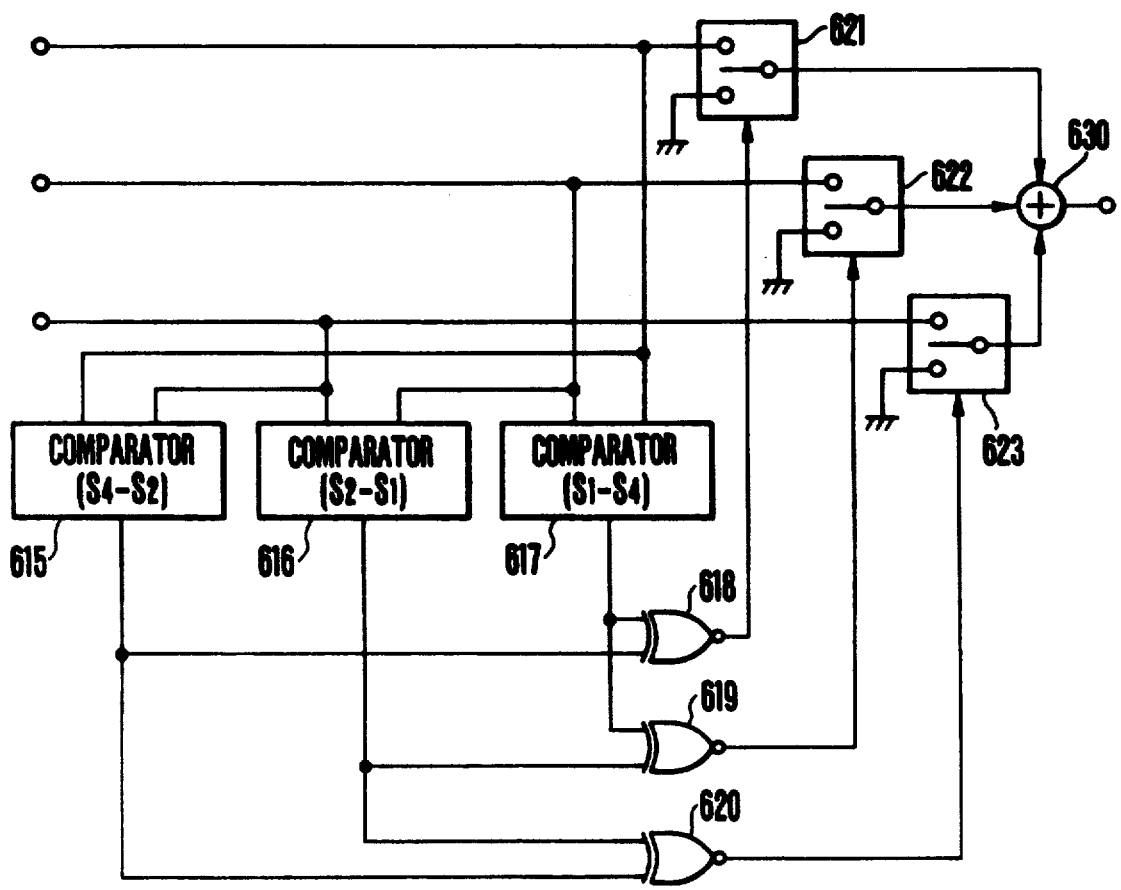

FIG. 25 is an electrical circuit diagram illustrating the construction of the central value selecting circuit in another example of the sixth embodiment shown in FIG. 18.

Figure 26C:
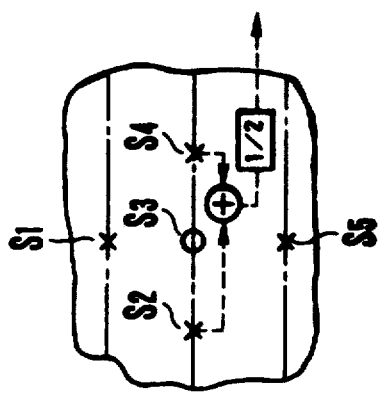
Figure 26B:
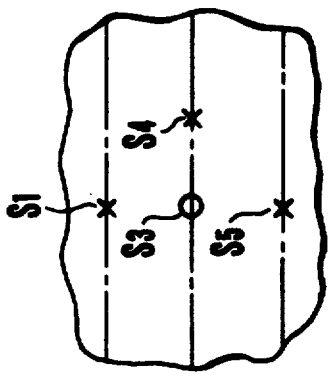
Figure 26A:
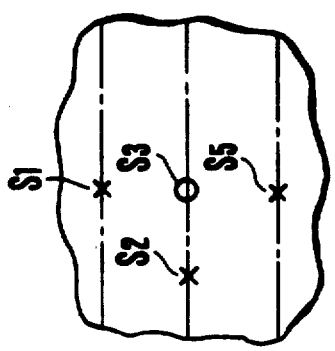

FIGS. 26(a), 26(b) and 26(c) are diagrams illustrating another example of extraction of the reference picture elements.

DETAILED DESCRIPTION OF THE PREFERRED EMBODIMENTS

In FIG. 18, a composite color television signal of the NTSC standards $S_4$ enters at an input terminal 601. A first delay circuit 605 is receptive of the signal $S_4$ to produce an output signal $S_3$ in delay of one picture element. A second delay circuit 606 is receptive of the signal $S_3$ to produce an output signal $S_2$ in delay of one picture element. A 1H delay circuit 607 is receptive of the signal $S_3$ to produce an output signal $S_1$ in delay of one line scanning period H, constituting picture element extracting means together with the first and second delay circuits 605 and 606. Signals to be compared are furnished by the illustrated connection lines extending from input terminal 601 and circuits 605 and 606 to median selection circuit. Such connection lines will be seen further to constitute comparing picture element signal forming circuitry.

Median selection circuit 608 as median selecting means selects the one of the signal $S_2$ from the second delay circuit 606, the signal $S_1$ from the 1H delay circuit 607 and the composite color television signal input at terminal 601 and outputs the signal which takes the median value. A subtractor 609 performs subtraction of the signal $S_3$ and the signal selected by the median selection circuit 608. An adder 610 performs addition of the signal $S_3$ and the signal from the circuit 608, constituting computing means together with the subtractor 609.

FIGS. 19 to 21 are diagrams illustrating the construction of the aforesaid median selection circuit.

In these figures, maximum value detecting circuits 611, 612 and 613 each are receptive of two inputs for producing an output representing the larger one of the values of the two inputs, and is of known construction as shown in FIG. 20, comprising two transistors $TR_1$ and $TR_2$ and a resistor $R_1$. The circuit 611 receives the signals $S_4$ and $S_2$, the circuit 612 receives the signals $S_2$ and $S_1$, and the circuit 613 receives the signals $S_1$ and $S_4$. A minimum value detecting circuit 614 receptive of the output signals from the circuits 611, 612 and 613 produces an output signal representing the minimum, value among them, and is of known construction as shown in FIG. 21, comprising three transistors $TR_3$, $TR_4$ and $TR_5$ and a resistor $R_2$.

The operation of the circuit of such construction is next described with reference to FIGS. 22 and 23. Suppose it is now that the signal $S_4$ has entered the circuit at the input terminal 601, the positional relationship of the individual signals $S_1$–$S_4$ in the frame becomes like that shown in FIG. 22. That is, on taking the signal $S_3$ from the first delay circuit 605 as the remark picture element, the picture element for the signal $S_1$ from the second delay circuit 606 and the picture element for the signal $S_4$ entering at the input terminal 601 take their places adjacent to the remark picture element on the left and right sides thereof respectively. The picture element for the signal $S_1$ is $1_H$ ahead of the remark picture element. Therefore, these picture elements $S_1$, $S_2$ and $S_4$ (hereinafter referred to as the "reference" picture elements) each have a phase difference of 180° in the color subcarrier relative to the remark picture element $S_3$.

Here, suppose that the values of these reference picture elements $S_1$, $S_2$ and $S_4$ fall in, for example, a relationship:

$$S_4 > S_2 > S_1 \tag{1}$$

the maximum value detecting circuits 611, 612 and 613 of the median selection circuit 608 select the picture elements $S_4$, $S_2$ and $S_4$ to be placed on their output lines respectively. Then, out of these outputs, the minimum value detecting circuit 614 selects the picture element $S_2$. That is, the median value $S_2$ in the relationship of (1) is selected. Therefore, if the picture has a horizontal or vertical edge line, e, as shown in FIGS. 23(a) and 23(b), across which the contrast steeply changes, one of the values of the picture elements differs largely from the others, as shown in FIGS. 24(a) and 24(b). Then, this picture element is certainly removed by the median selection circuit 608. That is, by selecting the median value, the picture element of direction toward a weak correlation is removed, because the median value has a high correlation. Then, the selected median value is applied to the subtractor 609 and adder 610, wherein it is computed with the signal $S_3$. The output of the subtractor 609 represents the chrominance signal, and the output of the adder 610 represents the luminance signal. That is, the chrominance and luminance signals can be expressed respectively by $$C_6 = |S_3 - MED(S_1, S_2, S_4)|/2$$

$$Y_6 = |S_3 + MED(S_1, S_2, S_4)|/2$$

where MED($S_1$, $S_2$, $S_4$) represents the median of the values of the $S_1$, $S_2$ and $S_4$.

It will be appreciated from the foregoing that in this embodiment, the picture elements $S_2$ and $S_4$ lying adjacent to the remark picture element $S_3$ on the left and right sides thereof and the picture element lying 1H ahead are taken as the reference picture elements, and their median value is selected to insure that the high value of correlation is always used selectively. Because the computation for Y/C separation can be performed on this, a high resolution can be preserved at the edge even in the vertical direction of the picture.

We next explain about an example of modification of the embodiment shown in FIG. 18. This example is different from that of FIG. 18 in that the median selection circuit is replaced by a circuit shown in FIG. 25. In FIG. 25, comparators 615, 616 and 617 produce outputs of H level when the difference between the two inputs is positive, and of L level when it is negative. The outputs of the comparators 615, 616 and 617 represent ($S_4-S_2$), ($S_2-S_1$) and ($S_1-S_4$), respectively. Exclusive NOR circuits 618, 619 and 620 receive the outputs of the paired comparators 615 and 617, 616 and 617 and 615 and 616 respectively, and produce control signals for switches 621, 622 and 623 respectively. When the control signal is H, the switch takes its "a" position. When L, it takes its "b" position. The outputs of these switches are applied to an adder 630.

Now assuming that the input signals $S_4$, $S_2$ and $S_1$ fall in, for example, the relationship:

$$S_4 > S_2 > S_1 \qquad (1),$$

then the comparators 615, 616 and 617 produce the outputs of H, H and L levels respectively. Responsive to these, the exclusive NOR circuits 618, 619 and 620 produce the outputs of L, L and H levels respectively. Thereby, while the switches 621 and 622 remain in their "b" positions, only the switch 623 is moved to its "a" position. Therefore, the signal $S_2$, in other words, the median value in the above-described relationship (1), is output.

Though the embodiment has been described in connection with the use of the picture elements $S_1$, $S_2$ and $S_4$ extracted as the reference picture elements as shown in FIGS. 23(a) and 23(b), the present invention is not confined to the illustrated embodiment, since other picture elements may be chosen as the reference picture elements provided that they have a phase difference of 180° in the color subcarrier relative to the remark picture element.

For example, instead of the reference picture element $S_4$ or $S_2$ shown in FIG. 22, a picture element $S_5$ may be extracted as the reference picture element as shown in FIGS. 26(a) and 26(b). For this case, however, the necessity of using two 1H delay circuits 607 arises. Another example of variation is that, as shown in FIG. 26(c), the upper, lower, left hand and right hand adjacent picture elements to the remark picture element $S_3$, namely, $S_1$, $S_2$, $S_4$ and $S_5$ are extracted so that it is even possible to use $S_1$, $S_5$ and $(S_2+S_4)/2$ as the reference picture elements. The last-noted reference picture element is obtained by a computer processing circuit means implementing the adding circuit and division functions indicated by the circuitry noted in FIG. 26(c) for reference picture element samples adjacent the remark picture element signal. According to this, the accuracy of Y/C separation can approach closer to the ideal. Further, in the case where, similarly to the case of FIG. 26(c), the four picture elements $S_1$, $S_2$, $S_3$ and $S_4$ are extracted, means may be provided for evaluating their correlations with the remark picture element and determining which of the picture elements $S_2$ and $S_4$ should be used as one of the reference picture elements.

In the above-described embodiments, as the delay circuits use is made of the analog type with the aim of achieving a reduction of the cost. Yet, it is obvious that this invention enables application of digital delay circuits.

Also, although, in the embodiments, the signal to be processed is the composite color television signal of the NTSC standards with the sampling frequency equal to 4 times the frequency of the color subcarrier, it is to be understood that the present invention is applicable to other signals such as those of PAL or SECAM standards with slight modification of the picture element grouping scheme.

What is claimed is:

1. A video processing system which receives as an input a composite color television signal having frequency-multiplexed luminance and chrominance signals, in which said composite color television signal is divided into a plurality of picture element signals by sampling it, and the luminance and chrominance signals frequency-multiplexed in each of said plurality of picture element signals are separated, comprising:
   (a) remark picture element signal extracting means for taking part of said composite color television signal as a remark picture element signal and extracting said remark picture element signal from said composite color television signal;
   (b) reference picture element signal extracting means for taking parts of the composite color television signal whose chrominance signal frequency-multiplexed therein is of reverse phase to the chrominance signal frequency-multiplexed in said remark picture element signal as reference picture element signals and extracting a plurality of said reference picture element signals from said composite color television signal;
   (c) selecting means for selecting out of said plurality of reference picture element signals extracted by said reference picture element signal extracting means the one which takes a median value and producing it; and
   (d) separating means for separating the luminance signal and the chrominance signal frequency-multiplexed in the remark picture element signal extracted by said remark picture element signal extracting means by using said selected one of said reference picture element signals and outputting the separated luminance and chrominance signals.

2. A system according to claim 1, wherein said remark picture element signal extracting means includes a first delay circuit in which the input composite color television signal is placed in delay of a first time and is then output.

3. A system according to claim 2, wherein said reference picture element signal extracting means includes a plurality of second delay circuits which have different delay times from each other, to delay the composite color television signal which has been delayed by said first delay circuit and to output the delayed signals.

4. A system according to claim 1, wherein said reference picture element signal extracting means includes a computer processing circuit, and said computer processing circuit is arranged to effect computer processing of a part of the composite color television signals whose chrominance signal frequency-multiplexed therein is of reverse phase to the chrominance signal frequency-multiplexed in said remark picture element signal and to output the computer-processed signal as a reference picture element signal.

5. A system according to claim 4, wherein said computer processing circuit includes an adding circuit and a division circuit.

6. A system according to claim 1, wherein said selecting means includes:
  (a) a plurality of maximum value selecting circuits for comparing said plurality of reference picture element signals extracted by said reference picture element signal extracting means and said composite color television signal in different combinations to select the reference picture element signal thereamong which takes a maximum value in each of said combinations; and
  (b) a minimum value selection circuit for comparing the plurality of reference picture element signals produced from said plurality of maximum value selection circuits to select the reference picture element signal thereamong which takes a minimum value.

7. A system according to claim 1, wherein said separating means includes computing means having as inputs said selected one reference picture element signal and said remark picture element signal.

8. A system according to claim 7, wherein said computing means includes an adding circuit and a subtracting circuit.

9. A system according to claim 1, wherein said selection means includes:
  (a) a plurality of maximum value selection circuits for comparing said plurality of reference picture elements signals relative to said plurality of reference picture element signals extracted by said reference picture element signal extracting means in different combinations to select the reference picture element signal which takes a maximum value of reference picture element signal; and
  (b) a minimum value selecting circuit for comparing said plurality of reference picture element signals produced from said plurality of maximum value selection circuits to select the reference picture element signal which takes a minimum value of reference picture element signal.

10. A video processing system which receives as an input a composite color television signal having frequency-multiplexed luminance and chrominance signals, in which said composite color television signal is divided into a plurality of picture element signals by sampling it, and the luminance and chrominance signals frequency-multiplexed in each of said plurality of picture element signals are separated, comprising:
  (a) remark picture element signal extracting means for extracting an arbitrary one of said plurality of picture element signals as a remark picture element signal;
  (b) reference picture element signal extracting means for extracting a plurality of reference picture element signals from said plurality of picture element signals, each said reference picture element signal being composed of a picture element signal frequency-multiplexed with a chrominance signal having a phase reverse to that of the chrominance signal frequency-multiplexed in said remark picture element signal;
  (c) computer processing means for computer-processing a part of said plurality of reference picture element signals extracted by said reference picture element signal extracting means and outputting computer-processed reference picture element signals;
  (d) selection means for selecting a reference picture element signal representing a central value among said plurality of reference picture element signals extracted by said reference picture element signal extracting means and the computer-processed reference picture element signals; and
  (e) separating means for separating the luminance signals and the chrominance signals frequency-multiplexed in the selected computer-processed reference picture element signal by using said remark picture element signal extracted by said remark picture element signal extracting means and outputting said separated signals.

11. A video processing system according to claim 10, wherein said computer processing means includes an adding circuit and a division circuit.

12. A video processing system according to claim 10, wherein said separating means includes:
  computing means for computer-processing said remark picture element signal and said reference picture element signal to form a luminance signal and a chrominance signal.

13. A video processing system according to claim 12, wherein said computing means includes an adding circuit and a subtracting circuit.

14. A video processing system which receives as an input a composite color television signal having frequency-multiplexed luminance and chrominance signals, in which said composite color television signal is divided into a plurality of picture element signals by sampling it, and the luminance and chrominance signals frequency-multiplexed in each of said plurality of picture element signals are separated, comprising:
  (a) remark picture element signal extracting means for extracting an arbitrary one of said plurality of picture element signals as a remark picture element signal;
  (b) reference picture element signal extracting means for extracting a plurality of reference picture element signals from said plurality of picture element signals, said reference picture element signals being composed of picture element signals whose chrominance signal frequency-multiplexed therein has a phase reverse to that of the chrominance signal frequency-multiplexed in said remark picture element signal;
  (c) comparing picture element signal forming means for forming a plurality kinds of comparing picture element signals corresponding to said plurality of reference picture element signals extracted by said reference picture element signal extracting means;
  (d) a plurality of maximum value selection means for comparing said plurality of kinds of comparing picture element signals formed by said comparing picture element signal forming means and said composite color television signal in different combinations to select the comparing picture element signal thereamong which takes a maximum value in each of said combinations;

(e) minimum value selection means for comparing the plurality of comparing picture element signals selected in said plurality of maximum value selection means with one another to select the comparing picture element signal thereamong which takes a minimum value; and (f) separating means for separating the luminance signals and the chrominance signals frequency-multiplexed in said remark picture element signal extracted by said remark picture element signal extracting means by using said selected minimum value comparing picture element signal and outputting the separated signals.

15. A video processing system which receives as an input a composite color television signal having frequency-multiplexed luminance and chrominance signals, in which said composite color television signal is divided into a plurality of picture element signals by sampling it, and the luminance and chrominance signals frequency-multiplexed in each of said plurality of picture element signals are separated, comprising:

(a) remark picture element signal extracting means for extracting an arbitrary one of said plurality of picture element signals as a remark picture element signal;

(b) reference picture element signal extracting means for extracting at least three picture element signals, as reference picture element signals, from the picture element signals located adjacent to said remark picture element signal;

(c) computer processing means for computing an average value of a part of the reference picture element signals corresponding to the reference picture element signals located adjacent to said remark picture element signal and outputting a computed reference signal indicative of said average value;

(d) selection means for selecting a reference picture element signal representing a central value of the plurality of the reference picture element signals outputted from said reference picture element signal extracting means and the computed reference picture element signal output from said computer processing means; and (e) separating means for separating the luminance signals and the chrominance signals frequency-multiplexed in said remark picture element signal extracted by said remark picture element signal extracting means by using said selected reference picture element signal and outputting said separated signals.

16. A video processing system according to claim 15, wherein said reference picture signal extracting picture signal extracting means is arranged to extract the picture element signals located above and below and located right and left of said remark picture element signal as reference picture element signals and to output said reference picture element signals.

17. A system according to claim 15, wherein said computer processing means includes an adding circuit and a division circuit.

18. A system according to claim 15, wherein said selection means includes:

A) a plurality of maximum value selection means for comparing said plurality of reference picture element signals output from said reference picture element signal extracting means and the computed reference picture element signal output from said computer processing means with one another in different combinations to select the reference picture element signal thereamong which takes a maximum value in each of said combinations; and B) minimum value selection means for comparing the plurality of reference picture element signals output from said plurality of maximum value selection means with one another to select the reference picture element signal thereamong which takes a minimum value.

19. A system according to claim 15, wherein said separating means includes:

computing means for processing said remark picture element signal extracted by said remark picture element signal extracting means and said selected reference picture element signal to form a luminance signal and a chrominance signal.

20. A system according to claim 19, wherein said computing means includes an adding circuit and a subtracting circuit.

* * * * *

UNITED STATES PATENT AND TRADEMARK OFFICE
CERTIFICATE OF CORRECTION

PATENT NO. : 5,155,583
DATED : October 13, 1992
INVENTOR(S) : Katsuji Yoshimura; et al.

It is certified that error appears in the above-identified patent and that said Letters Patent is hereby corrected as shown below:

```
Col. 1, line 20.    Change "informations" to -- information --
Col. 1, lines 29, 30.  Change "(2+)fsct) + Vcos(2+)fsct)."
                    to -- (2 D fsc +) + Vcos (2 D fsc +). --
Col. 1, line 39.    Change "informations" to -- information --
Col. 2, line 8,     Change "deteriorations" to -- deterioration
                    --
Col. 5, line 57.    Change "left hand" to -- left-hand --
Col. 5, line 57.    Change "right hand" to -- right-hand --
```

Signed and Sealed this

Eighth Day of March, 1994

Attest:

BRUCE LEHMAN

*Attesting Officer*    *Commissioner of Patents and Trademarks*